UNITED STATES PATENT OFFICE.

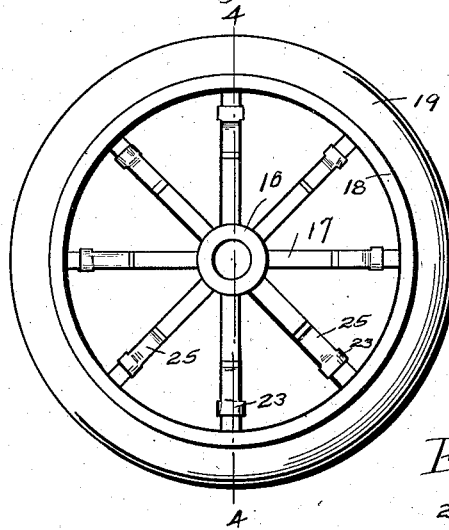
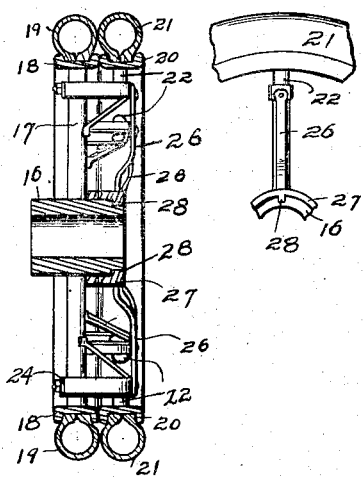
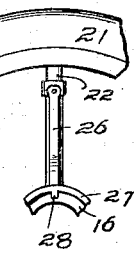
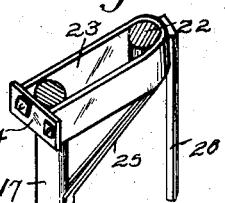
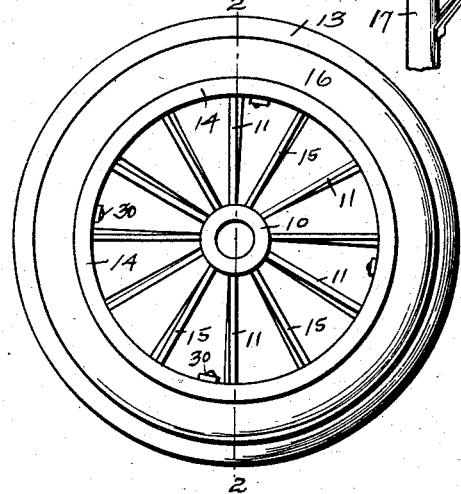
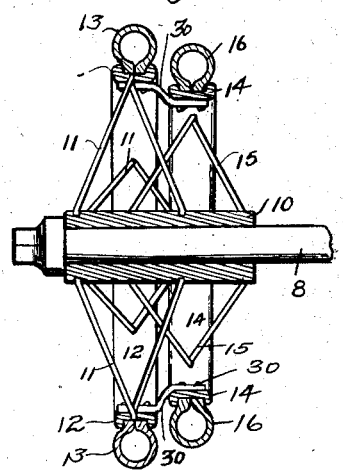

LESLIE FRY, OF DES MOINES, IOWA.

SAFETY-WHEEL.

1,190,537.   Specification of Letters Patent.   Patented July 11, 1916.

Application filed November 26, 1915. Serial No. 63,533.

*To all whom it may concern:*

Be it known that I, LESLIE FRY, a citizen of the United States, and resident of Des Moines, in the county of Polk and State of Iowa, have invented a certain new and useful Safety-Wheel, of which the following is a specification.

The object of my invention is to provide a safety wheel for motor vehicles of simple, durable and inexpensive construction.

A further object is to provide a safety wheel of the type having pneumatic tires, and having two rims with tires thereon, suitably supported on the axle in such a way that if one of the tires should become suddenly deflated the machine will be supported upon the other.

My invention consists in the construction, arrangement and combination of the various parts of the device whereby the objects contemplated are attained, as hereinafter more fully set forth, pointed out in my claims, and illustrated in the accompanying drawings, in which:

Figure 1 shows a side elevation of a safety wheel embodying my invention. Fig. 2 shows a vertical, transverse sectional view of the same taken on the line 2—2 of Fig. 1. Fig. 3 shows a side elevation of a modified form of my invention. Fig. 4 shows a transverse vertical central view through the form of the device shown in Fig. 3, Fig. 5 shows a perspective view partly in section of the bracket for mounting the auxiliary rim and tire on the spokes of the main wheel, and Fig. 6 shows a detail view of part of the device shown in Fig. 4.

It is well known that in very fast driving and in road and track races disastrous accidents frequently occur as a result of blow-outs which causes one wheel to drop several inches whereby the driver loses control of his car. It is my purpose to provide a device whereby the danger due to blow-outs will be practically eliminated.

My invention can be made in a variety of forms, and I have in the drawings illustrated at least two forms.

In Figs. 1 to 2, I have shown the central hub indicated by the reference numeral 10 which may be of any suitable form and is mounted on the axle 8, and need not necessarily differ from the ordinary hub except that it is somewhat longer. Mounted on the hub 10 by means of wire spokes 11 of the ordinary type is a rim 12 carrying a pneumatic tire 13. A second rim 14 is mounted by somewhat shorter spokes upon the hub 10. The rim 14 carries a pneumatic tire 16 somewhat smaller in diameter than the tire 13. The rims 12 and 14 are preferably mounted quite close together and the inner ends of the spokes 11 and 15 may be overlapped, as shown in Fig. 2. With the device such as that shown in Figs. 1 and 2, it will readily be seen that if the tire 13 should blow out or fail for any reason, then the car instead of dropping upon the rim 12 and skidding, will drop a very short distance upon the tire 16 and the driver can go to the pits and have a new rim 12 or a new tire 13 put on.

While only a conventional form of the rim 12 and tire 13 have been shown, it will of course be understood that my invention contemplates the use of demountable rims when desired.

Another advantage found in a device such as that shown in Figs. 1 and 2 arises from the fact that if the spokes 11 should, for any reason, fail on account of the tremendous strain due to rounding curves at a high rate of speed, the machine will not be wrecked, but will drop upon the smaller wheel and be supported thereon.

The rims 12 and 14 may be suitably connected by braces 30.

In Figs. 3 to 5 inclusive, I have shown a slightly modified form of my invention. The modified form of my invention comprises a hub 16 from which radially extend ordinary wooden spokes 17 on the outer ends of which is a rim 18 carrying a pneumatic tire 19. A second rim 20 carrying a pneumatic tire 21 is arranged at the side of the rim 18 and may be of the same size as the rim 18. The rim 20 has short inwardly projecting spoke members 22. The spokes on the rim 20 and the spoke members 22 are secured to the spokes 17 by means of yoke-shaped brackets 23 and plates 24 bolted to the arms of the brackets 23. Braces 25 extend from the brackets 23 at points adjacent to the respective members 22 and are inclined inwardly and to the respective spokes 10, as clearly shown in Figs. 4 and 5.

If desired reinforcing and supporting spoke members 26 may be extended from the members 22 and 23 as shown in Fig. 4, and connected with a collar 27 on the hub 16.

The hub 16 and collar 27 are provided with coacting notches and lugs 28 whereby rotation of the collar on the hub is prevented.

In the form of the device shown in Fig. 4, the auxiliary rim and tire may be quickly and easily installed on or removed from the ordinary wheel, and may be used if desired only when the car is subjected to special strain.

The advantages of my improved safety wheel are largely obvious from the foregoing description.

The danger due to the bursting of the tire is practically eliminated by my improved device.

My safety wheel can be made at a comparatively small expense, and the form shown in Figs. 3 to 5 may be used as a removable attachment.

My invention may be built in various forms, without departing from the essential features and purposes thereof, and it is my intention to cover by this application any such changes which may be included within the scope of my claim.

I claim as my invention:

A safety wheel comprising an elongated hub, a pair of rims arranged adjacent to each other one of said rims of slightly smaller diameter than the other rim, wire spokes connecting the respective rims with the hub, the adjacent spokes of the different rims being arranged to overlap each other, whereby the rims may be mounted close together, and cross braces secured to and connecting the said rims.

Des Moines, Iowa, October 20, 1915.

LESLIE FRY.